United States Patent
Meer et al.

(10) Patent No.: US 7,177,398 B2
(45) Date of Patent: *Feb. 13, 2007

(54) BI-DIRECTIONAL MESSAGING FOR AN EMERGENCY SERVICES NETWORK

(75) Inventors: Stephen Marc Meer, Niwot, CO (US); Gregory Wilfred Bruening, Boulder, CO (US); Lawrence W. Ciesla, Yorkville, IL (US); Michael Jay Nelson, Louisville, CO (US); Peter Roy Schmidt, Westminster, CO (US)

(73) Assignee: Intrado Inc., Longmont, CO (US)

( * ) Notice: Subject to any disclaimer, the term of this patent is extended or adjusted under 35 U.S.C. 154(b) by 132 days.

This patent is subject to a terminal disclaimer.

(21) Appl. No.: 10/816,633

(22) Filed: Apr. 2, 2004

(65) Prior Publication Data

US 2005/0201528 A1 Sep. 15, 2005

Related U.S. Application Data

(60) Provisional application No. 60/552,870, filed on Mar. 13, 2004.

(51) Int. Cl.
*H04M 11/00* (2006.01)
(52) U.S. Cl. .......................................... 379/45; 379/37
(58) Field of Classification Search ............ 379/37–51, 379/142.06, 216.01; 455/404.1, 404.2
See application file for complete search history.

(56) References Cited

U.S. PATENT DOCUMENTS

| | | | |
|---|---|---|---|
| 6,064,722 A * | 5/2000 | Clise et al. ................... 379/37 |
| 6,151,385 A | 11/2000 | Reich et al. | |
| 6,385,302 B1 | 5/2002 | Antonucci et al. | |
| 6,415,018 B1 | 7/2002 | Antonucci et al. | |
| 6,504,909 B1 | 1/2003 | Cook et al. | |
| 6,584,307 B1 | 6/2003 | Antonucci et al. | |
| 6,587,545 B1 | 7/2003 | Antonucci et al. | |
| 6,600,812 B1 * | 7/2003 | Gentillin et al. ............. 379/45 |
| 6,604,722 B1 | 8/2003 | Tan | |
| 6,707,888 B1 | 3/2004 | Cope | |
| 6,771,742 B2 * | 8/2004 | McCalmont et al. ......... 379/45 |
| 7,050,787 B2 * | 5/2006 | Caci ...................... 455/404.2 |
| 2002/0057764 A1 | 5/2002 | Salvucci et al. | |
| 2003/0086539 A1 | 5/2003 | McCalmont et al. | |

* cited by examiner

*Primary Examiner*—Stella Woo (57) ABSTRACT

The invention includes a communication network that comprises a conforming emergency system coupled to an emergency services network by a media channel. The emergency services network includes a resource coupled to a plurality of emergency services. When in operation, the conforming emergency system transmits an emergency event message to the resource over the media channel. The emergency event message includes a retrieval key. Responsive to receiving the emergency event message and the retrieval key, the resource initiates an emergency event session corresponding with the retrieval key. During the emergency event session, the resource transmits multiple responses to the conforming emergency system. Also during the emergency event session, the resource receives information corresponding with the retrieval key from at least one of the emergency services, and transmits the multiple responses containing the information.

21 Claims, 6 Drawing Sheets

BI-DIRECTIONAL MESSAGING FOR AN EMERGENCY SERVICES NETWORK

RELATED APPLICATIONS

This non-provisional application claims priority to U.S. provisional application 60/552,870, which was filed on Mar. 13, 2004.

BACKGROUND OF THE INVENTION

1. Field of the Invention

The invention is related to the field of emergency services, and in particular, to networks, methods, and systems using bi-directional messaging for an emergency services network. More particularly, a conforming emergency system, such as a Public Safety Answering Point (PSAP), and a resource of an emergency services network establish an emergency event session during which either device may initiate and transmit multiple messages.

2. Statement of the Problem

In the United States, basic 9-1-1 service is an emergency reporting service where a calling party can dial 9-1-1 in emergency situations. The call is answered at a Public Safety Answering Point (PSAP, also known as a "Public Safety Access Point"). An operator at the PSAP converses with the calling party to determine information on the emergency situation. For instance, the operator may ask the calling party for his/her name, the nature of the emergency, and the location of the emergency, etc. Based on the information gathered by the operator, the operator then contacts emergency personnel to respond to the emergency.

Enhanced 9-1-1 service (E9-1-1) has the added feature of automatically providing the operator with some information on the calling party. For instance, E9-1-1 service includes the added features of Automatic Number Identification (ANI) and Automatic Location Identification (ALI). With Automatic Number Identification (ANI), the operator is automatically provided with telephone number of the phone placing the call for emergency services (e.g., a 9-1-1 call). With Automatic Location Identification (ALI), the PSAP, or another device, queries an ALI database for information on the physical location of the calling party's phone. An ALI database stores records of telephone numbers. A record in the ALI database contains information (such as a street address) on a physical location that corresponds with a telephone number. Responsive to a query from the PSAP, the ALI database returns the location information for the calling party. With the telephone number and the location information, the operator can more effectively handle the emergency call. Other countries have emergency services similar to this.

Traditional communication networks have a rigid architecture when it comes to connecting to an emergency services network. In a traditional communication network, a PSAP connects to a pair of ALI databases in the emergency services network. A pair of ALI databases is used for redundancy and reliability. The PSAP connects to each ALI database over a dedicated point-to-point connection. The ALI databases are the only resources in the emergency services network that connect with the PSAP.

One problem with current emergency services networks is that the PSAP-ALI interface model is a request-response model. The PSAP forwards a request for information to the ALI database, and the ALI database provides a single response to the PSAP. Under the current model, the PSAP has to initiate communication with the ALI database using a request. The ALI database is not allowed or equipped to initiate a communication with the PSAP and deliver information to the PSAP unless the PSAP first submits a request. The ALI database is also not allowed to transmit multiple messages to a PSAP responsive to a request. The ALI database is only allowed to transmit a single response message responsive to a request. The current PSAP-ALI interface model limits the types of enhanced services provided by the emergency services network.

Another problem with current emergency services networks is the traditional PSAP-ALI interface uses a limited message set. Most conventional PSAPs fundamentally include the same design as when they were initially conceived in the 1970's. The conventional PSAPs are configured to receive a fixed-length, pre-defined text string. The fixed-length text string limits the number of fields and the size of the fields that can be included in the text string. The small size of the text string severely constrains the amount of information that the ALI database can provide to the PSAP, the context that can be created, and the data types that can be supported. Emergency services administrators have had to "overload" the text string, using the same fixed-length field for multiple purposes in different contexts, to provide the current services. New services or new capabilities are very difficult to add if the text string is overloaded by the current services. For instance, an ALI database would not be able to provide or would only be able to provide very limited individual medical information to the PSAP. Also, the technology does not lend itself to streaming video to the PSAP as the traditional message set does not have the capacity.

SUMMARY OF THE SOLUTION

The invention helps solve the above and other problems by allowing resources in the emergency services network to initiate communications with a conforming emergency system (e.g. a PSAP) and provide multiple responses to the conformation emergency system. The invention also helps solve the above problems by having the resources in the emergency services network communicate with the conforming emergency system using a larger and more flexible message set. The invention advantageously allows the emergency services network provide enhanced services to the conforming emergency system and broadens the number of participants that can access the emergency services network. Some of the enhanced services are improved communication and information delivery, enhanced algorithms for retrieving relevant information, event correlation and event management tools, advanced media and data type delivery, and integration with advanced call routing, selective routing, and call transfer logic.

One embodiment of the invention comprises a communication network that includes a conforming emergency system coupled to an emergency services network by a media channel. An example of a conforming emergency system is a Public Safety Answering Point (PSAP). The emergency services network includes a resource coupled to a plurality of emergency services. When in operation, the conforming emergency system transmits an emergency event message to the resource over the media channel. The emergency event message includes a retrieval key. Responsive to receiving the emergency event message and the retrieval key, the resource initiates an emergency event session corresponding with the retrieval key. During the emergency event session, the resource transmits multiple responses to the conforming emergency system responsive to the emergency event message. Also during the emergency event session, the resource receives information corresponding with the retrieval key from one or more emergency services. The resource transmits the information from the emergency service in the multiple responses. The resource may transmit individual responses further responsive to receiving information from individual emergency services.

The invention may include other networks, systems, and methods described below.

DESCRIPTION OF THE DRAWINGS

The same reference number represents the same element on all drawings.

DETAILED DESCRIPTION OF THE INVENTION

Description of the Prior Art

Figure 1:
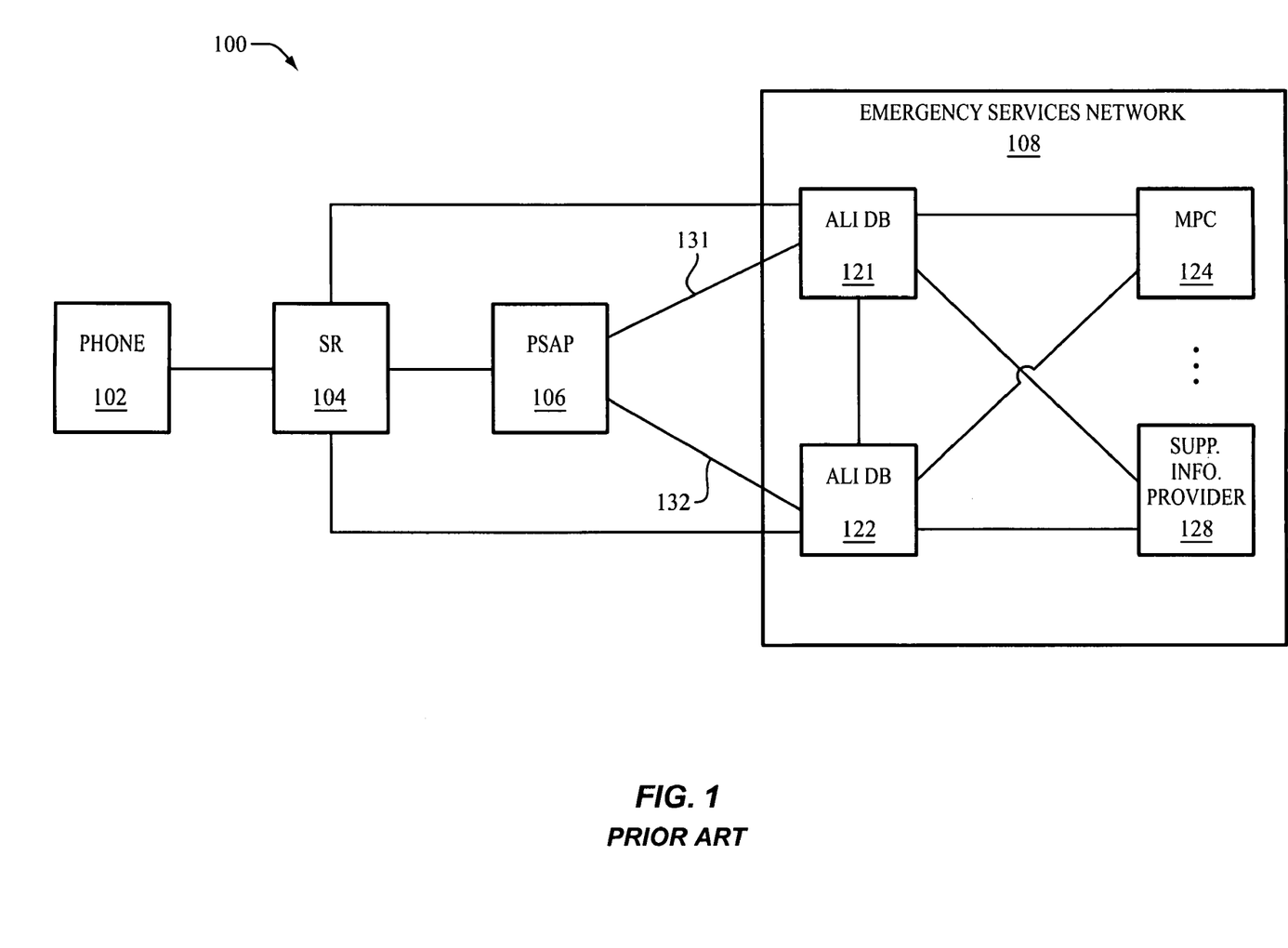
FIG. 1 illustrates a communication network that provides emergency services in the prior art, such as 9-1-1 service in the United States.

FIG. 1 illustrates a prior art communication network 100 that provides emergency services. Communication network 100 includes a telephone 102, a selective router (SR) 104, a Public Safety Answering Point (PSAP) 106, and an emergency services network 108. Emergency services network 108 includes two ALI databases 121–122, a Mobile Positioning Center (MPC) 124 (or a Gateway Mobile Location Center (GMLC)), a supplemental information provider 128, and other backend resources (not shown). Although a single MPC 124 and a single supplemental information provider 128 are illustrated in FIG. 1, emergency services network 108 generally includes multiple MPCs and supplemental information providers. As shown in FIG. 1, telephone 102 is connected to selective router 104. Selective router 104 is connected to PSAP 106 and ALI databases 121–122. PSAP 106 is connected to ALI databases 121–122. ALI database 121 is connected to ALI database 122, MPC 124, and supplemental information provider 128. ALI database 122 is connected to ALI database 121, MPC 124, and supplemental information provider 128.

Paired ALI databases 121–122 are used in emergency services networks, such as emergency service network 108, to add redundancy and reliability into the network. Each PSAP 106 (only one is shown) connects to two ALI databases 121–122. For the PSAP-ALI interface, PSAP 106 is connected to ALI database 121 by a dedicated point-to-point connection 131, and is connected to ALI database 122 by a dedicated point-to-point connection 132. The PSAP-ALI interface traditionally includes fixed point-to-point data circuits utilizing asynchronous data modems for the dedicated connections 131–132. In newer versions of the PSAP-ALI interface, dedicated connections 131–132 may include an upgraded transport protocol, such as Internet Protocol (IP) or X.25. Regardless of the transport protocol, the logical connections between PSAP 106 and ALI databases 121–122 remain point-to-point dedicated connections 131–132.

To illustrate how communication network 100 operates, assume that a caller dials 9-1-1 or a similar emergency number on telephone 102. Selective router 104 receives the emergency call, such as through a central office (not shown), a tandem switch (not shown), etc. Selective router 104 also receives an Emergency Service Number (ESN) associated with the location of the calling party from one or more ALI databases 121–122 or from another database (not shown). In FIG. 1, based on the ESN, selective router 104 selects PSAP 106 to handle the call and routes the emergency call to PSAP 106. Networks may route the emergency call to PSAP 106 in different ways depending on the desired implementation. Some examples of different implementations are illustrated in U.S. Pat. No. 6,415,018, U.S. Pat. No. 6,584,307, U.S. Pat. No. 6,385,302, and U.S. Pat. No. 6,587,545, which are all incorporated herein by reference to the same extent as if fully set forth herein.

Emergency services network 108, which provides E9-1-1 services, includes Automatic Location Identification (ALI) services. When PSAP 106 receives the emergency call, PSAP 106 also receives an ANI for the call. The ANI, which is the telephone number of the calling party telephone 102, allows an operator in PSAP 106 to call the calling party back if the call happens to be terminated. The ANI also allows the PSAP 106 to fetch information on the physical location of the calling party in order to dispatch the appropriate emergency personnel (e.g., police, ambulance, fire department). To fetch the location information, PSAP 106 generates a request for the location information that includes the ANI of telephone 102, and forwards the request to ALI database 121 over dedicated connection 131. PSAP 106 may forward the request to ALI database 122 over dedicated connection 132 in addition to forwarding the request to ALI database 121 or instead of forwarding the request to ALI database 121.

ALI database 121 receives the request for location information that includes the ANI. ALI database 121 searches for location information corresponding with the ANI. If ALI database 121 finds location information corresponding with the ANI, then ALI database 121 responds to PSAP 106 with the location information. If ALI database 121 does not find location information corresponding with the ANI, then ALI database 121 may have to query other ALI databases or other databases or systems for the location information.

ALI database 121 acts as an intermediary between PSAP 106 and the other emergency services in emergency services network 108. PSAP 106 does not directly connect with emergency services other than ALI databases 121–122. PSAP 106 communicates with MPC 124 and supplemental information provider 128 through one or both of ALI databases 121–122. For instance, if telephone 102 is a mobile phone, then ALI database 121 queries MPC 124 or another MPC (not shown) for location information corresponding with the ANI and forwards the location information to PSAP 106. ALI database 121 may provide supplemental information provider 128 with the ANI, and supplemental information provide 128 may provide services such as notifying third parties of the emergency call. In each of these cases, ALI database 121 interfaces PSAP 106 with the other emergency services.

When PSAP 106 receives a response from ALI database 121, PSAP 106 should be better informed to handle the emergency call. For instance, PSAP 106 should have location information for the calling party. PSAP 106 then informs the appropriate emergency personnel of the emergency call so that the emergency personnel can be quickly dispatched.

One problem with current emergency services networks is that the PSAP-ALI interface uses dedicated point-to-point connections 131–132 between PSAP 106 and ALI databases 121–122. PSAP 106 is not able to dynamically connect with another ALI database (not shown) or another resource in emergency services network 108. PSAP 106 is dependant on the pair of ALI databases 121–122 to provide information for an emergency call. If one of the ALI databases 121 were to be taken out of service for maintenance or upgrades, then PSAP 106 would be connected to a single ALI database 122 and become one-sided. If the remaining ALI database 122 was to go out of service, then PSAP 106 would not be able to adequately service emergency calls. Emergency services administrators try to avoid architectures that rely on a single device or system because of the higher possibility of a service outage.

Another problem with current emergency services networks is the traditional PSAP-ALI interface uses a limited message set. Most conventional PSAPs fundamentally include the same design as when they were initially conceived in the 1970's. The conventional PSAPs are configured to receive a fixed-length, pre-defined text string. The fixed-length text string limits the number of fields and the size of the fields that can be included in the text string. The small size of the text stream severely constrains the amount of information that the ALI database can provide to the PSAP, the context that can be created, and the data types that can be supported. Emergency services administrators have had to "overload" the text string, using the same fixed-length field for multiple purposes in different contexts, to provide the current services. New services or new capabilities are very difficult to add if the text string is overloaded by the current services. For instance, an ALI database would not be able to provide or would only be able to provide very limited individual medical information to the PSAP. Also, the technology does not lend itself to streaming video to the PSAP as the traditional message set does not have the capacity.

Another problem with current emergency services networks is that the PSAP-ALI interface model is a request-response model. The PSAP forwards a request for information to the ALI database, and the ALI database provides a single response to the PSAP. Under the current model, the PSAP has to initiate communication with the ALI database using a request. The ALI database is not allowed or equipped to initiate a communication with the PSAP and deliver information to the PSAP unless the PSAP first submits a request. The ALI database is also not allowed to transmit multiple messages to a PSAP responsive to a request. The ALI database is only allowed to transmit a single response message responsive to a request. The current PSAP-ALI interface model limits the types of enhanced services provided by the emergency services network.

The following example illustrates some of the problems and limitations of the current emergency services networks. Assume that telephone 102 comprises a mobile telephone and that a user of telephone 102 dials 9-1-1. Selective router 104 routes the 9-1-1 call to PSAP 106.

Figure 2:
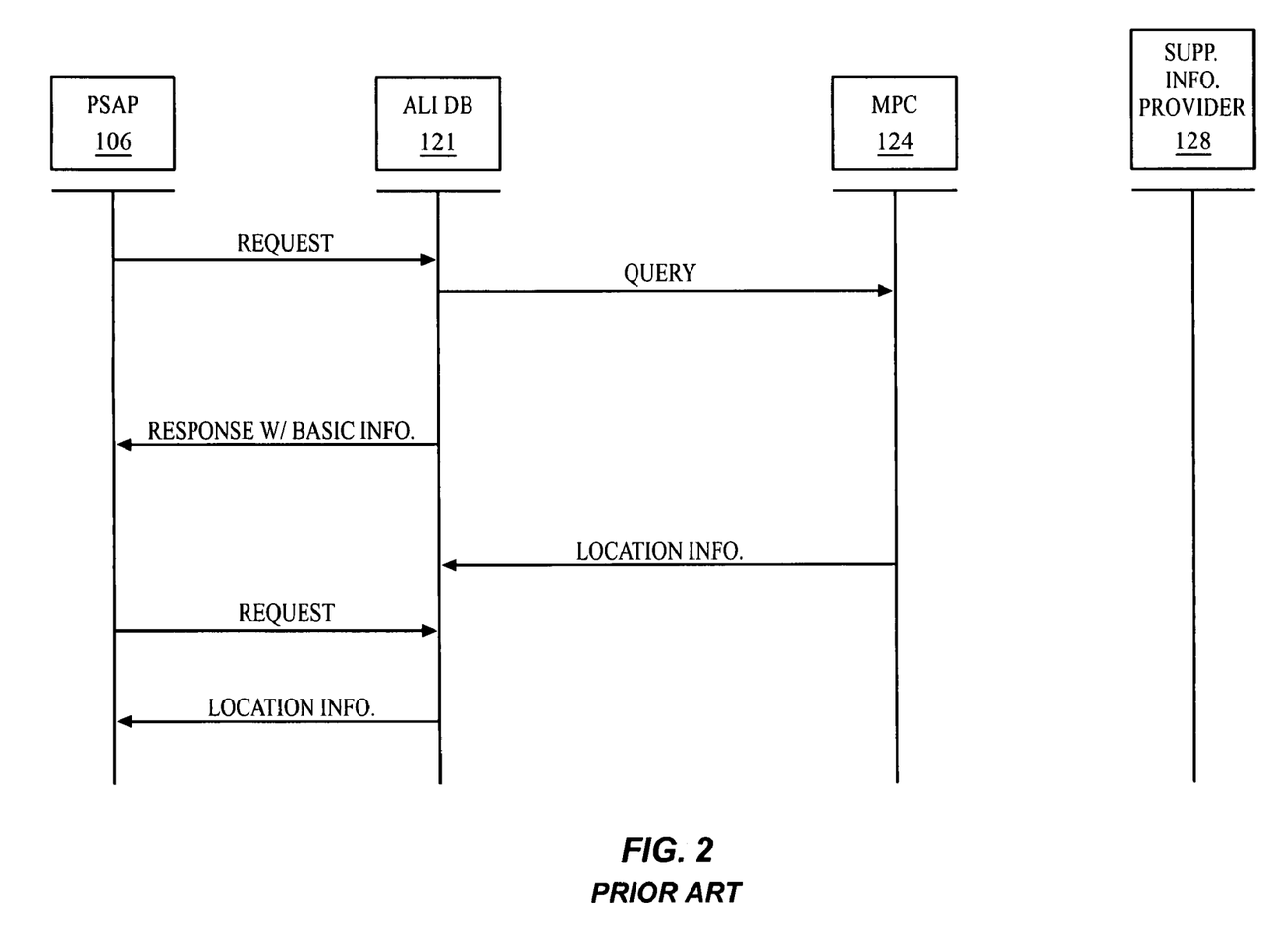
FIG. 2 is a message chart illustrating messages transmitted within the communication network of FIG. 1 in the prior art.

FIG. 2 is a message chart illustrating messages transmitted within prior art communication network 100. PSAP 106 submits a request, including the ANI for the 9-1-1 call, to ALI database 121 for information and services corresponding with the ANI. Responsive to receiving the request, ALI database 121 determines that the ANI is a pseudo-ANI corresponding with a wireless service provider for telephone 102. The ANI is not the actual telephone number of telephone 102, but is a key corresponding with basic information identifying the wireless service provider and/or identifying the cell tower from which the 9-1-1 call originated.

Because the pseudo-ANI is for a wireless service provider, ALI database 121 does not have location information for the pseudo-ANI. Consequently, ALI database 121 cannot immediately provide the location information to PSAP 106 because it must attempt to retrieve location information for telephone 102. ALI database 121 retrieves the location information by submitting a query to the wireless service provider's MPC 124. Because the PSAP-ALI interface allows only one response to a request, ALI database 121 attempts to collect all call information before responding to PSAP 106. ALI database 121 also attempts to ensure that PSAP 106 receives a response within a reasonable amount of time.

Before submitting a query to MPC 124, ALI database 121 sets a timer to indicate how long it will wait for MPC 124 to respond. Assume that MPC 124 does not respond within the time period. ALI database 121 then responds to the original request from PSAP 106 with basic call information. The basic call information does not specify the location of telephone 102. The basic call information may merely be information on the wireless service provider or information on the cell tower from which the 9-1-1 call originated.

After ALI database 121 responds to PSAP 106 with basic call information, assume that MPC 124 transmits location information for telephone 102 to ALI database 121. The location information may be approximate X, Y coordinates (longitude and latitude) of telephone 102 (assuming a wireless Phase II system). ALI database 121 cannot provide the location information to PSAP 106 because there is not a pending request from PSAP 106. ALI database 121 stores the location information until PSAP 106 submits another request to ALI database 121.

ALI database 121 then receives a second request from PSAP 106. Responsive to receiving the second request, ALI database 121 needs to determine whether to send the location information received from MPC 124, transmit a query for new location information from MPC 124, handle timeout scenarios, and handle situations where this request may be for a new 9-1-1 call using the same pseudo-ANI. This scenario is further complicated because the ALI database 121 does not know when this call ends and another call with the same pseudo-ANI begins. Thus, ALI database 121 uses an elaborate scheme of timers to determine if the information received from MPC 124 is stale, and determines whether it should return the information for subsequent requests from PSAP 106 or whether it should submit a new query to MPC 124.

Assume that ALI database 121 decides to use the current location information. Responsive to the second request from PSAP 106, ALI database 121 transmits the location information to PSAP 106. ALI database 121 uses the standard message set for the location information so that PSAP 106 may properly display the information on a screen in PSAP 106.

While ALI database 121 is querying MPC 124 for information, PSAP 106 may be connected with a calling party possibly engaged in a life or death situation where any bit of information might help determine the best course of action. ALI database 121 cannot tell PSAP 106 that it takes more time to determine location information for telephone 102 because of technology overhead. PSAP 106 may have to wait 10 to 15 seconds to be told nothing more than that the 9-1-1 call is a wireless call.

The request-response model of the PSAP-ALI interface puts the PSAP operator in a guessing game. The PSAP operator does not know when the location information becomes available and does not know how often re-bids should be submitted to receive initial or new information. PSAP operators are taught not to push the re-bid button repeatedly in hopes of getting call information, as this could have the opposite effect and swamp ALI database 121 or the MPC 124 in a manner such that PSAP 106 cannot receive a response.

As is illustrated above, the current emergency services networks use old technology, are not very flexible in updating or improving existing services, and are not readily expandable to add new and better services. The importance of emergency services networks demands that these networks evolve to provide the best and most reliable services.

Description of the Invention

FIGS. 3–6 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 3:
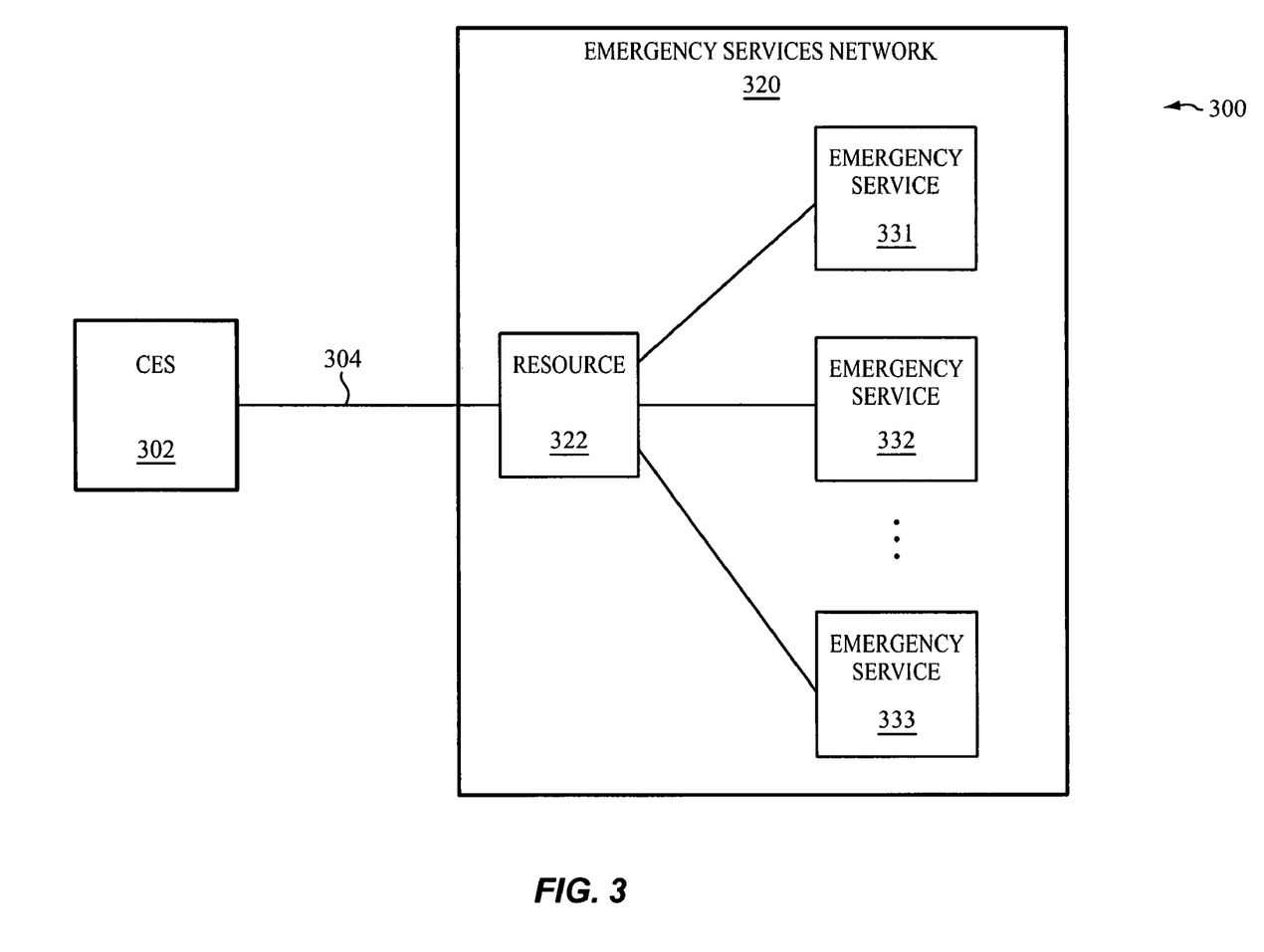
FIG. 3 illustrates a communication network in an exemplary embodiment of the invention.

FIG. 3 illustrates a communication network 300 in an exemplary embodiment of the invention. Communication network 300 includes a conforming emergency system (CES) 302 coupled to an emergency services network 320 by a media channel 304. Media channel 304 is established over a transport network (not shown). Emergency services network 320 includes a resource 322 coupled to a plurality of emergency services 331–333. Resource 322 may be coupled to emergency services 331–333 by an Internet Protocol (IP) network or another transport network. Communication network 300 may include other devices, resources, or systems not shown in FIG. 3 for the sake of brevity. Emergency services network 320 may include many more resources and emergency services in addition to the ones shown in FIG. 3. For instance, in some embodiments of communication network 300, each emergency service 331–333 may include a resource, such as resource 322. FIG. 3 is intended to illustrate communication network 300 in a more functional manner than a physical manner. Depending on the embodiment, resource 322 may be part of any of emergency services 331–333 or an independent system.

A conforming emergency system comprises any system, device, or equipment configured to communicate according to the message set used by an emergency services network to access emergency services (not shown) to handle emergency events. One example of a conforming emergency system is a computer system for a Public Safety Answering Point (PSAP) conforming to the message set used by an emergency services network. A PSAP is known in the art of emergency services as a location where an emergency call (e.g., a 9-1-1 call) is answered. Another example of a conforming emergency system is a computer system for a hospital, a police department, a fire station, a fire alarm company, a security company, an ambulance service, a state 9-1-1 coordinator, the Federal Emergency Management Agency (FEMA), the Department of Homeland Security, the National Geophysical Data Center, the Center for Disease Control (CDC), etc, that conforms to the message set used by an emergency services network and is used to access in emergency services to handle emergency events. An emergency event comprises any instance or situation where a request for emergency services may be made. Examples of an emergency event include any abbreviated number call (e.g., a 9-1-1 call in the U.S., a 3-1-1 call in the U.S., and a 1-1-2 call in Europe), any call or request from a computer, a PDA, a TDD device, or any other device for emergency services, an email message, an SMS message, an Internet message, a call or signal to an emergency call center (e.g., an independent alarm service, OnStar®, etc), or any other request for emergency services.

A transport network in this embodiment comprises any connection(s), path(s), etc for supporting a media channel, such as a packet network, an Internet Protocol (IP) network, a frame relay network, an X.25 network, an Asynchronous Transfer Mode (ATM) network, wireless connections, satellite connections, wireline connections, etc. A resource comprises any system, device, equipment, or server configured to communicate with a conforming emergency system via a media channel over a transport network to facilitate the handling of emergency events. An example of a resource includes a response gateway. A media channel comprises any communication path or paths (logical, virtual, or otherwise) over a transport network configured to transport data such as streaming video, streaming audio, voice, graphics, text data, binary data, executable instructions or scripts, etc. A media channel is not a physical point-to-point dedicated connection over a transport network. The media channel may transport control messages or may operate in conjunction with a separate control channel. A response gateway comprises any system or server configured to communicate with a conforming emergency system via a media channel over a packet network, and interface the conforming emergency system with emergency services of an emergency services network.

An emergency services network includes any network or networks that provide emergency services or facilitates a conforming emergency system in handling emergency events. Emergency services comprise any services subscribed to or provided for an emergency call or other event requiring or needing such services. One example of an emergency service is an ALI database that provides location information. Another example of an emergency service is a Mobile Positioning Center (MPC) or a Gateway Mobile Location Center (GMLC) that provides location information for mobile devices. Another example of an emergency service is a Voice over Internet Protocol (VoIP) server or a selective transfer point determination system that provides location information for a VoIP phone or device. Another example of an emergency service is an Emergency Auxiliary Service Provider (EASP) or an Emergency Information Service, which are general terms for any service provider that provides information or performs a function. For instance, an EASP may contain medical information for a subscriber and information on a subscriber's premises, such as a code to a front gate, guard dogs, hazardous materials, etc. The EASP may also include a third-party notification service that notifies third parties of an emergency event. The term "emergency service" is intended to include any accompanying structure that performs the emergency services, such as processing systems, computing platforms, network interfaces, servers, etc. The function of a resource may be included in or as part of an emergency service. Thus, a resource may also include an ALI database, an MPC, a GMLC, an EASP, a VoIP server, or any other emergency service.

Figure 4:
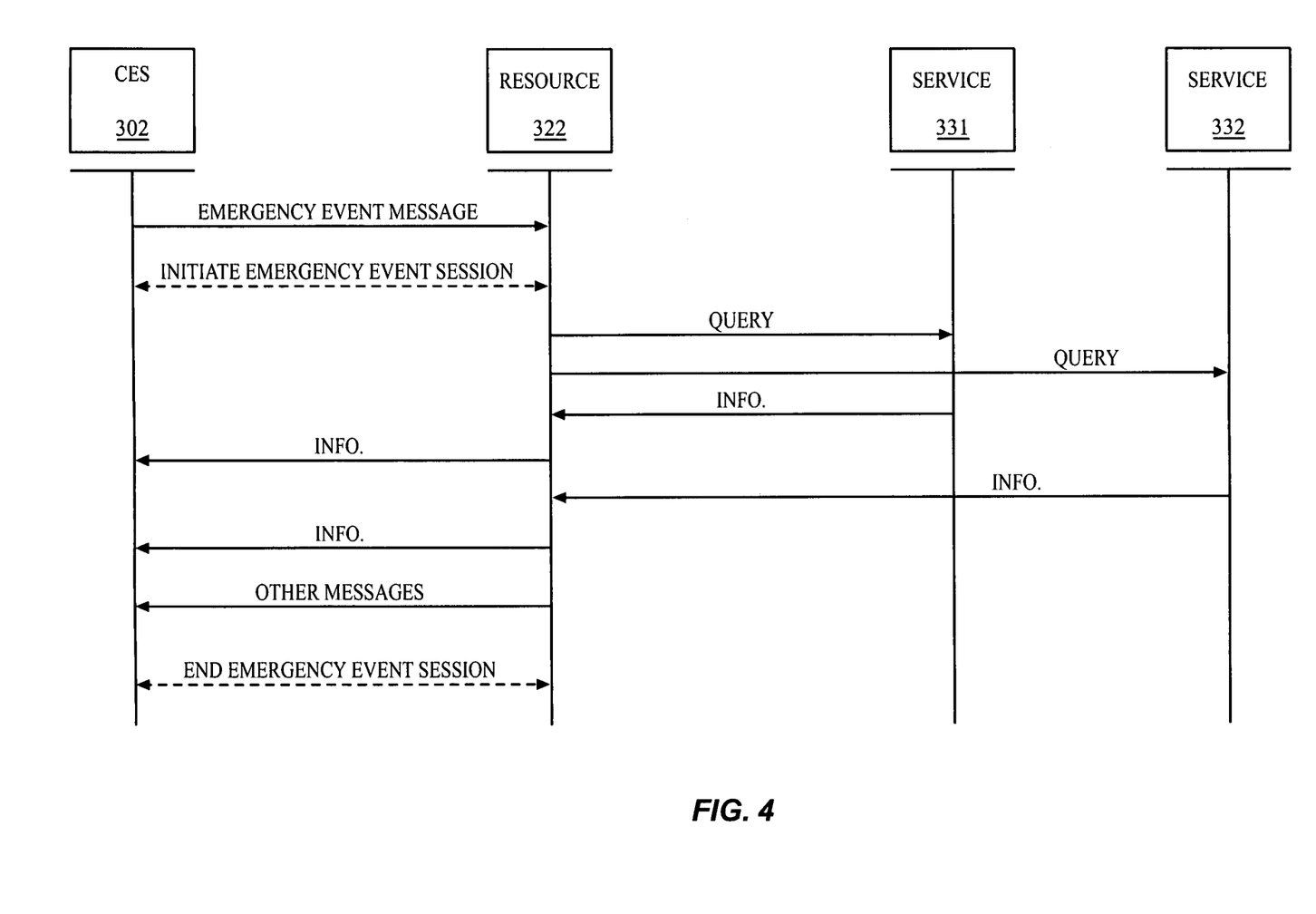
FIG. 4 is a message diagram illustrating communications in the communication network of FIG. 3 in an exemplary embodiment of the invention.

FIG. 4 is a message diagram illustrating communications in communication network 300 in an exemplary embodiment of the invention. Assume that CES 302 is handling an emergency event and needs to access information in emergency services network 320 to handle the emergency event. To access the information, CES 302 transmits an emergency event message to resource 322 over media channel 304. The event message includes a retrieval key. A retrieval key comprises any indicator, token, or key, such as a telephone number (including a dialed number, Emergency Service Routing Digits (ESRD), Emergency Service Routing Keys (ESRK), or any other string of digits according to the E.164 encoding scheme), a network address (including a Session Initiation Protocol (SIP) address, a MAC address, an IP address, a Universal Resource Identifier, or any other form of identification associated with a communication device), a trunk ID, a social security number, a street address, an employee ID, an email address, and an incident ID. Responsive to receiving the retrieval key in the emergency event message, resource 322 initiates an emergency event session corresponding with the retrieval key. An emergency event session comprises any period of communication between a conforming emergency system and a resource over a media channel for a particular retrieval key. Multiple emergency event sessions for multiple retrieval keys may be established over a media channel.

During the emergency event session for the retrieval key, resource 322 transmits multiple responses to CES 302 during the emergency event session responsive to the emergency event message. As shown in FIG. 4, CES 302 transmits a single emergency event message, and resource 322 responds with first information, second information, and other messages (such as status messages). By transmitting multiple responses responsive to the emergency event message, communication network 300 is not limited to the prior art request-response model. Further, resource 322 may initiate a response (or another message) without first receiving a request from CES 302.

Also during the emergency event session, resource 322 receives information corresponding with the retrieval key from one or more emergency services 331–333. Resource 322 may query the emergency services 331–333 for information corresponding with the retrieval key. After receiving the information corresponding with the retrieval key, one or more of the multiple responses transmitted by resource 322 to CES 302 contains the information. Resource 322 may transmit individual responses further responsive to receiving information from individual emergency services 331–333. Transmitting the individual responses in this embodiment means that resource 322 voluntarily transmits the responses to CES 302, and is not limited to the request-response model of the prior art.

In some embodiments, during the emergency event session, resource 322 determines which emergency services 331–333 correspond with the retrieval key. To "correspond with" means that the emergency service includes information associated with the retrieval key or that a subscriber has subscribed to a service using the retrieval key. Assume for this example that resource 322 determines that emergency services 331–333 correspond with the retrieval key. Resource 322 transmits queries for information to emergency services 331–333 using the retrieval key.

When resource 322 receives the information from emergency service 331, resource 322 transmits a response containing the information to CES 302. When resource 322 receives the information from emergency service 332, resource 322 transmits a response containing the information to CES 302. When resource 322 receives the information from emergency service 333, resource 322 transmits a response containing the information to CES 302. Resource 322 does not have to wait for a request message from CES 302 before transmitting the multiple responses to CES 302. Resource 322 may transmit the multiple responses at its own volition, but preferably as soon as the information is received from the individual emergency services.

In some embodiments, CES 302 may communicate with one or more of the emergency services 331–333 directly via a media channel. When in communication, CES 302 may query the emergency service 331–333 for information corresponding with the retrieval key.

Resource 322 may transmit other messages to CES 302. For instance, resource 322 may transmit management data, status reports, etc, to CES 302. CES 302 and/or resource 322 may end the emergency event session when all information and services have been provided for the retrieval key or if CES 302 no longer needs information from resource 322. Resource 322 may also initiate an emergency event session by transmitting an emergency event message to CES 302 that includes another retrieval key. Resource 322 or CES 302 initiates another emergency event session corresponding with the other retrieval key. Resource 322 may then transmit multiple responses to CES 302 during the other emergency event session. Similarly, CES 302 may transmit multiple responses to resource 322. The term "response" is not limited to be "responsive" to a request. A response comprises any message initiated and transmitted by a system.

Emergency services network 320 uses a new message set for transmitting the responses and information to CES 302. The message set used by emergency services network 320 allows either CES 302 or resource 322 to initiate the transfer of a message. The emergency event session allows for a dialog between CES 302 and resource 322 so that either one may transmit a message when they have something to provide to the other. As previously discussed, the prior art communication networks have a PSAP-ALI interface that uses a request-response model. Communication network 300 is not limited to the request-response model, as either resource 322 or CES 302 may initiate a transfer of a message. Resource 322 and CES 302 have an open dialog during an emergency event session, which was not allowed in the prior art communication networks.

The new message set also allows resource 322 to provide enhanced data types to CES 302. In the prior art, the PSAP-ALI interface only allowed the ALI database to provide a fixed-length text string to the PSAP. The new message set is flexible and allows resource 322 to transmit larger data streams. For instance, resource 322 may transmit information in the form of streaming video, streaming audio, graphics data, voice, text data, binary data, executable instructions or scripts, etc.

CES 302, resource 322, and emergency services 331–333 may be comprised of instructions that are stored on storage media (not shown). The instructions can be retrieved and executed by a processor (not shown). Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Figure 5:
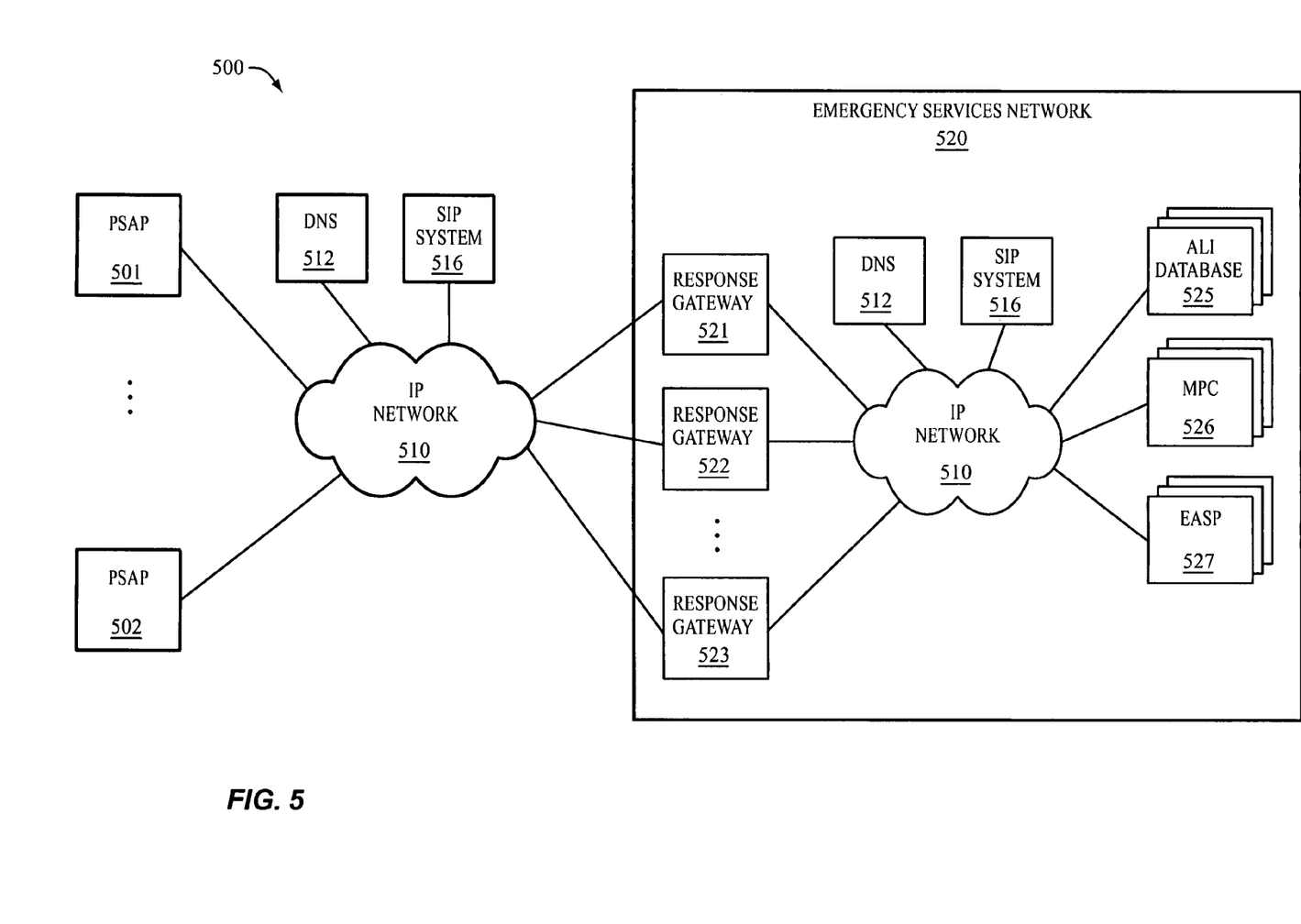
FIG. 5 illustrates another communication network in an exemplary embodiment of the invention.

FIG. 5 illustrates another communication network 500 in an exemplary embodiment of the invention. Communication network 500 includes a plurality of PSAPs 501–502, an Internet Protocol (IP) network 510, a Domain Name Server (DNS) 512, a Session Initiation Protocol (SIP) system 516, and an emergency services network 520. Emergency services network 520 includes a plurality of response gateways 521–523, ALI databases 525, Mobile Positioning Centers (MPC) 526, and Emergency Auxiliary Service Providers (EASP) 527. Response gateways 521–523 operate similar to, or are examples of, a resource 322 in FIG. 3. ALI databases 525, Mobile Positioning Centers (MPC) 526, and Emergency Auxiliary Service Providers (EASP) 527 operate similar to, or are examples of, emergency services 331–333 in FIG. 3. PSAPs 501–502, DNS 512, SIP system 516, response gateways 521–523, ALI databases 525, MPCs 526, and EASPs 527 are connected to packet network 510. Communication network 500 may include other devices, resources, or systems not shown in FIG. 5 for the sake of brevity.

Domain name server 512 is known in the art as a system that resolves host names into IP addresses. SIP system 516 comprises any system that uses SIP to assist in dynamically establishing a media channel. Examples of SIP system 516 include a SIP proxy and a SIP server. ALI database 525 (may also be referred to as an ALI system or ALI server) is known in the art of emergency services as a system that provides information on the location of a calling party station (e.g., phone). MPC 526 (or GMLC) is known in the art of emergency services as a system that provides information on the location of a mobile calling device (e.g., cell phone). EASP is a general term for any service provider that provides information or performs a function. For instance, EASP 527 may contain medical information for a subscriber and information on a subscriber's premises, such as a code to a front gate, guard dogs, hazardous materials, etc. EASP 527 may also include a third-party notification service that notifies third parties of an emergency event.

In operation, PSAP 501 needs to access emergency services network 520 in order to obtain information on an emergency call, such as a 9-1-1 call. Unlike prior networks, PSAP 501 does not have dedicated point-to-point connections with a pair of ALI databases to obtain the information. PSAP 501 has to dynamically establish a media channel with emergency services network 520 to obtain the information.

To start, PSAP 501 initiates setup of a media channel with a response gateway 521–523 of emergency services network 520. PSAP 501 may initiate the setup of a media channel periodically based on a timer, may initiate the setup of a media channel responsive to an instruction from another device or system, or may initiate the setup of a media channel responsive to receiving an emergency call. PSAP 501 uses SIP to initiate the setup of the media channel. PSAP 501 generates an Invite message and transmits the Invite message over a TCP/IP connection to IP network 510. The TCP/IP connection may be a secure connection. The Invite message may include a host address, such as "RG@EmergProvider.com". IP network 510 forwards the host address to DNS 512. DNS 512 resolves the host address in the Invite message to an IP address for SIP system 516, and IP network 510 forwards the Invite message to SIP system 516.

Responsive to receiving the Invite message, SIP system 516 determines which of the response gateways 521–523 is available. SIP system 516 may include logic (not shown) that is able to monitor the availability of response gateways 521–523 and determine which of the response gateways 521–523 is available. Response gateways 521–523 may periodically update SIP system 516 as to their availability and status. SIP system 516 may also query other systems (not shown) having logic that is able to determine which of the response gateways 521–523 is available.

SIP system 516 selects one of the response gateways 521–523 (assume response gateway 521). SIP system 516 identifies an IP address of the selected response gateway 521 and forwards the Invite message over IP network 510 to the IP address of the selected response gateway 521.

Response gateway 521 receives the Invite message from SIP system 516 along with an IP address of PSAP 501. Response gateway 521 may authenticate PSAP 501 via a login and password, via a Public Key Infrastructure (PKI) exchange of digital signatures, via public key cryptography, etc. Response gateway 521 may also access the PSAP's authorization to determine specific services available and subscribed to by PSAP 501. Response gateway 521 negotiates with PSAP 501 or SIP system 516 regarding parameters associated with the media channel to be established. Response gateway 521 may use another protocol to facilitate the negotiation of the appropriate protocol or parameters related to the media channel, such as Session Description Protocol (SDP). SDP may be carried within SIP messages to facilitate the establishment of a media channel, the version of the protocol, or parameters associated with the media channel. SDP is one way that two end-points request a media channel and agree upon the nature of the media channel. If response gateway 521 and PSAP 501 agree on the parameters for the media channel, then response gateway 521 forwards an OK message to PSAP 501. PSAP 501 receives the OK message and initiates a process to dynamically establish a media channel. An example of initiating a process is setting up a Secure Sockets Layer (SSL) TCP/IP interface.

SIP system 516 may broker any messages or negotiations between response gateway 521 and PSAP 501 instead of response gateway 521 and PSAP 501 communicating directly.

If the selected response gateway 521 is not able to accept the media channel, then SIP system 516 or another device forwards the Invite message to another response gateway 522–523. The Invite message is forwarded to response gateways 522–523 until a response gateway is found that can accept the media channel.

With the media channel established, PSAP 501 and response gateway 521 communicate over the media channel using a bi-directional message set that allows either PSAP 501 or response gateway 521 to initiate the transfer of messages voluntarily. Assume that PSAP 501 receives a 9-1-1 call and an ANI for the 9-1-1 call. To service the 9-1-1 call, PSAP 501 accesses emergency services network 520 over the established media channel.

Figure 6:
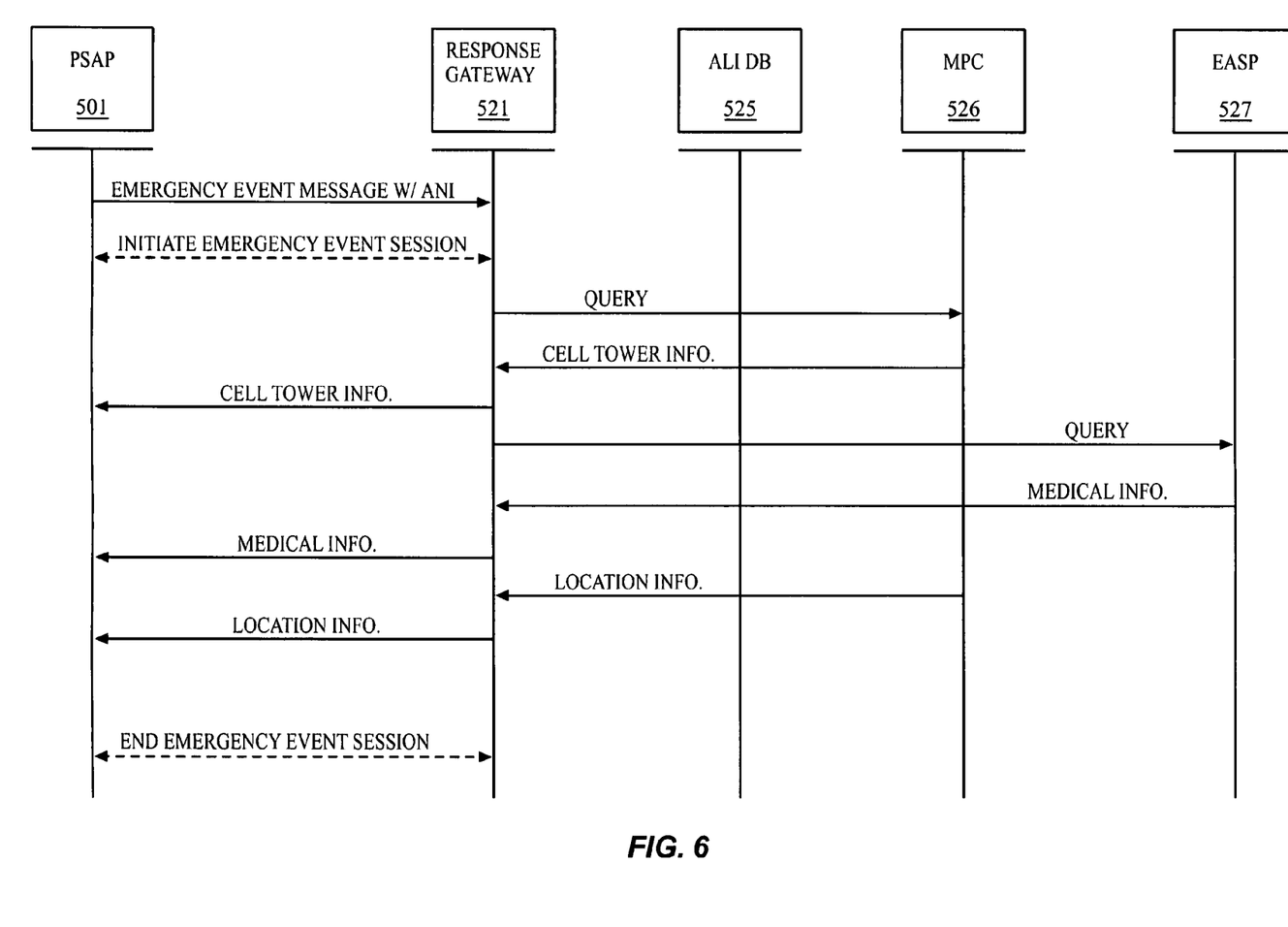
FIG. 6 is a message diagram illustrating communications in the communication network of FIG. 5 in an exemplary embodiment of the invention.

FIG. 6 illustrates a message diagram illustrating message transfers in communication network 500. To start, PSAP 501 transmits an emergency event message to response gateway 521 where the emergency event message includes the ANI for the 9-1-1 call. Responsive to receiving the emergency event message, response gateway 521 initiates an emergency event session corresponding with the ANI. During the emergency event session, response gateway 521 obtains information corresponding with the ANI and transmits the information it receives to PSAP 501. To obtain the information, response gateway 521 determines which services in emergency services network 520 correspond with the ANI. Response gateway 521 may query the individual services, such as ALI database 525, EASP 527, etc, to see if they correspond with the ANI. Response gateway 521 may know which services to contact based on information provided by PSAP 501 or based on information provided by another system (not shown).

Assume for this example that the 9-1-1 call originated from a cell phone. Response gateway 521 determines that MPC 526 and EASP 527 contain information corresponding with the ANI. Thus, response gateway 521 queries MPC 526 using the ANI for location information on the cell phone. Responsive to the query, MPC 526 immediately responds with information on the cell tower serving the cell phone. Responsive to receiving the information on the cell tower, response gateway 521 transmits a response that contains the cell tower information to PSAP 501.

If MPC 526 is not able to instantaneously provide the location information to response gateway 521, then response gateway 521 has to delay in providing actual location information to PSAP 501. During the delay period, response gateway 521 may provide a status message that informs PSAP 501 that the location information is being obtained and will be transmitted in the near future. The status message may also inform PSAP 501 that EASP 527 contains medical information for the ANI and that the medical information will be transmitted in the near future. Based on these status messages, PSAP 501 is not left wondering what and when information will come.

Response gateway 521 also queries EASP 527 using the ANI for information that EASP 527 may have. Assume that EASP 527 contains medical information associated with the ANI (e.g., medical information on the owner of the cell phone). Responsive to the query, EASP 527 responds with the medical information. Responsive to receiving the medical information, response gateway 521 transmits a response containing the medical information to PSAP 501.

During the period that EASP 527 is responding to response gateway 521, MPC 526 is attempting to determine the actual location of the cell phone. When MPC 526 determines the location of the cell phone, MPC 526 transmits the location information on the cell phone to response gateway 521. Responsive to receiving the location information, response gateway 521 transmits a response that contains the location information to PSAP 501.

Response gateway 521 and PSAP 501 may each transmit many more messages than those shown in FIG. 6. Response gateway 521 and/or PSAP 501 may end the emergency event session when all information and services have been provided for the ANI or if PSAP 501 no longer needs information from response gateway 521.

PSAP 501 receives the information for the ANI from resource gateway 521, and uses the information to handle the 9-1-1 call. For instance, PSAP 501 may use the information on the 9-1-1 call to better decide which emergency personnel to inform and/or dispatch.

In comparing FIG. 6 to the prior art FIG. 2, FIG. 2 shows that ALI database 121 receives location information from MPC 124. Because ALI database 121 does not have an outstanding request from PSAP 106, ALI database 121 is not able to transmit the location information to PSAP 106. ALI database 121 has to wait for a second request from PSAP 106 before transmitting the location information. FIG. 6, on the other hand, shows that response gateway 521 does not need to wait for a request from PSAP 501 before transmitting information. As soon as response gateway 521 receives the medical information from EASP 527, response gateway 521 transmits the medical information to PSAP 501. Similarly, as soon as response gateway 521 receives the location information from MPC 526, response gateway 521 transmits the location information to PSAP 501. PSAP 501 advantageously receives the medical information and location information sooner, which may be critical in an emergency situation.

The message set used by PSAP 501 and response gateway 521 is larger or more flexible than the message set used in the prior art. The message set includes management and monitoring messages, service messages, and report and status messages. The management messages provide the heartbeat or keep alive services as well as some connection management capabilities. These connection management tools help ensure that services are always available and recovery capabilities are tested on a continuous basis.

The service messages, which are illustrated in FIG. 6, create a context for an emergency event session so emergency services can be associated with the emergency event. Messages can be originated in either direction but will usually be initiated by the PSAP 501 creating the emergency event session. These messages will allow PSAP 501 to retrieve ALI information as well as interact with various emergency services in emergency service network 520. The messages and the interaction scenarios in which the messages are used address many of the limitations of legacy PSAP-ALI interface.

For instance, the service messages provide for the transfer of rich data types not allowed in conventional networks. The service messages provide for the transfer of streaming data from response gateway 521 to PSAP 501, such as streaming video and streaming audio. The service messages also provide for the transfer of graphics data, voice, text data, binary data, or executable instructions or scripts from response gateway 521 to PSAP 501.

The report and status messages implement metric reports as well as audit capabilities to ensure that information between PSAP 501 and response gateway 521 is consistent and appropriate. This includes items such as auditing calls in progress to ensure that services associated with the emergency call are performed properly.

PSAP 501 and response gateway 521 may use any compatible transport protocol for the messages, such as TCP/IP, HTTP, XML, and RTP. PSAP 501 and response gateway 521 may encrypt any transmitted messages for security purposes.

In conclusion, the embodiments of the invention described herein illustrate that using the new messaging allows the emergency services network to provide enhanced services and advanced media and data type delivery to a conforming emergency system. Thus, the conforming emergency system may better handle an emergency event such as a 9-1-1 call.

We claim:

1. A communication network for providing emergency services, the communication network comprising:
    an emergency services network comprising a resource connected to a plurality of emergency services; and
    a conforming emergency system (CES) connected to the resource of the emergency services network by a media channel,
    wherein the CES is configured to transmit, responsive to an emergency event, an emergency event message to the resource via the media channel, where the emergency event message includes a retrieval key; and
    wherein the resource is configured to initiate, responsive to the retrieval key in the emergency event message, an emergency event session corresponding with the retrieval key, and is further configured to transmit multiple responses to the CES during the emergency event session responsive to the emergency event message.

2. The communication network of claim 1 wherein:
    the resource is configured to transmit, responsive to receipt of information corresponding with the retrieval key from at least one of the emergency services, the multiple responses containing the information from the at least one emergency service.

3. The communication network of claim 2 wherein:
    the resource is configured to transmit individual responses further responsive to receiving information from individual emergency services.

4. The communication network of claim 1 wherein:
    the resource is configured to query a first emergency service for first information corresponding with the retrieval key and is configured to transmit a first response containing the first information to the CES responsive to receiving the first information from the first emergency service.

5. The communication network of claim 4 wherein:
    the resource is configured to query a second emergency service for second information corresponding with the retrieval key and is configured to transmit a second response containing the second information to the CES responsive to receiving the second information from the second emergency service.

6. The communication network of claim 5 wherein:
    the resource is configured to query a third emergency service for third information corresponding with the retrieval key and is configured to transmit a third response containing the third information to the CES responsive to receiving the third information from the third emergency service.

7. The communication network of claim 1 wherein the CES comprises a computer system for a Public Safety Answering Point (PSAP).

8. The communication network of claim 1 wherein the CES comprises a computer system for one of a hospital, a police department, a fire station, a fire alarm company, a security company, an ambulance service, a state 9-1-1 coordinator, the Federal Emergency Management Agency (FEMA), the Department of Homeland Security, the National Geophysical Data Center, or the Center for Disease Control (CDC).

9. The communication network of claim 1 wherein the resource comprises a response gateway.

10. The communication network of claim 1 wherein the emergency service comprises at least one of an ALI database, a Mobile Positioning Center (MPC), a Gateway Mobile Location Center (GMLC), an Emergency Auxiliary Service Provider (EASP), and a Voice over Internet Protocol (VoIP) server.

11. The communication network of claim 1 wherein the retrieval key comprises one of a telephone number, a network address, a Session Initiation Protocol (SIP) address, a trunk ID, a social security number, a street address, an employee ID, an email address, and an incident ID.

12. The communication network of claim 1 wherein information contained in the responses comprises one of streaming video, streaming audio, graphics data, voice, text or binary data, or executable instructions or scripts.

13. The communication network of claim 1 wherein:
the resource is configured to transmit another emergency event message to the CES, where the other emergency event message includes another retrieval key, is configured to initiate another emergency event session corresponding with the other retrieval key, and is configured to transmit multiple responses to the CES during the other emergency event session.

14. A method of operating a communication network for providing emergency services, wherein the communication network includes an emergency services network comprising a resource connected to a plurality of emergency services and a conforming emergency system (CES) connected to the resource of the emergency services network by a media channel, the method comprising the steps of:
transmitting an emergency event message that includes a retrieval key from the CES to the resource via the media channel; and
receiving the emergency event message in the resource, initiating an emergency event session corresponding with the retrieval key, and transmitting multiple responses to the CES via the media channel during the emergency event session responsive to the emergency event message.

15. The method of claim 14 further comprising the steps of:
receiving information corresponding with the retrieval key from at least one of the emergency services, and transmitting the multiple responses containing the information from the at least one emergency service.

16. The method of claim 15 wherein the step of transmitting multiple responses comprises transmitting individual responses further responsive to receiving information from individual emergency services.

17. The method of claim 14 further comprising the steps of:
querying a first emergency service for first information corresponding with the retrieval key, receiving the first information from the first emergency service, and transmitting a first response containing the first information to the CES responsive to receiving the first information from the first emergency service.

18. The method of claim 17 further comprising the steps of:
querying a second emergency service for second information corresponding with the retrieval key, receiving the second information from the second emergency service, and transmitting a second response containing the second information to the CES responsive to receiving the second information from the second emergency service.

19. The method of claim 18 further comprising the steps of:
querying a third emergency service for third information corresponding with the retrieval key, receiving the third information from the second emergency service, and transmitting a third response containing the third information to the CES responsive to receiving the third information from the third emergency service.

20. The method of claim 14 wherein the step of transmitting multiple responses to the CES comprises:
transmitting the multiple responses to the CES in XML messages.

21. The method of claim 14 further comprising the steps of:
transmitting another emergency event message from the resource to the CES, where the other emergency event message includes another retrieval key, initiating another emergency event session corresponding with the other retrieval key, and transmitting multiple responses to the CES during the other emergency event session.

* * * * *